United States Patent [19]

Hay, II

[11] 4,075,264

[45] Feb. 21, 1978

[54] METHOD OF INSULATING A CONTAINER

[75] Inventor: Robert A. Hay, II, Midland, Mich.

[73] Assignee: The Dow Chemical Company, Midland, Mich.

[21] Appl. No.: 673,335

[22] Filed: Apr. 2, 1976

[51] Int. Cl.[2] ........................ B21D 51/18; B29D 27/04

[52] U.S. Cl. ................................ 264/46.5; 29/421 R; 29/455 R; 220/9 F; 220/9 LG; 264/46.7; 264/46.9

[58] Field of Search ...................... 264/46.2, 46.5, 46.7, 264/46.9; 220/9 F, 9 LG; 29/421, 455

[56] References Cited

U.S. PATENT DOCUMENTS

| | | | |
|---|---|---|---|
| 3,169,379 | 2/1965 | Black | 220/9 LG X |
| 3,303,617 | 2/1967 | Hessburg et al. | 264/46.5 X |
| 3,313,020 | 4/1967 | Krauskopf | 264/46.5 X |
| 3,361,284 | 1/1968 | Luka et al. | 220/9 LG |
| 3,547,047 | 12/1970 | Needham | 29/455 X |
| 3,753,848 | 8/1973 | Bennet | 220/9 F X |
| 3,827,135 | 8/1974 | Yamamoto | 29/455 R |
| 3,830,396 | 8/1974 | Jackson | 220/9 LG |
| 3,861,021 | 1/1975 | Yamamoto | 29/455 R |
| 3,882,591 | 5/1975 | Yamamoto | 29/455 R |
| 3,919,855 | 11/1975 | Turner | 220/9 LG X |
| 3,927,788 | 12/1975 | Zinniger et al. | 220/9 LG |
| 4,027,379 | 6/1977 | Cheng et al. | 29/455 R |

FOREIGN PATENT DOCUMENTS

| | | | |
|---|---|---|---|
| 1,118,238 | 11/1961 | Germany | 220/9 LG |
| 2,232,233 | 1/1973 | Germany | 220/9 LG |
| 2,363,970 | 12/1973 | Germany | 220/9 LG |

*Primary Examiner*—Philip Anderson
*Attorney, Agent, or Firm*—R. B. Ingraham

[57] ABSTRACT

Vessel insulation is displaced from the adjacent surface of the vessel by fluid pressure and additional insulating material interposed between the insulation and the vessel.

6 Claims, 12 Drawing Figures

METHOD OF INSULATING A CONTAINER

In many instances, vessels are insulated with an insulating body, that is, of a generally monolithic character. Such insulation can be accomplished in a variety of ways such as by the joining of panels of insulating material in edge-to-edge relationship. One particularly desirable and advantageous process of insulation is known as spiral generation also useful for the preparation of free standing structures. Insulated vessels can be prepared by the spiral generation process by continuously winding a strip of foam plastic insulating material about a vessel in a generally helical-spiral manner and bonding at least adjacent edges of the insulation remote from the vessel wall being insulated to provide a generally monolithic insulation about an existing structure. Spiral generation is well-known and described in U.S. Pat. Nos. 3,206,899; 3,337,384; 3,372,430; 3,358,325; 3,372,431; 3,376,602; 3,442,992; 3,507,735; and 3,923,573; the teachings of which are hereby incorporated by reference thereto. The spiral generation technique is particularly desirable and suitable for the insulation of vessels having curved surfaces, for example, cylindrical or spherical tanks. Such foam thermal insulation may be applied to a vessel either internally or externally, or both externally and internally. In many instances, a thermally insulated vessel such as a tank may be confined within a rather limited space, for example, a spherical tank disposed at least partially within the hull of a ship. In such an instance, the size of the tank is limited by the hull of the ship. The space alloted for application of the insulation once the vessel or tank has been installed in the ship can be small; for example, if a vessel 35 meters in diameter is required, the ship's hull must be substantially wider than 35 meters. Space must be left, not only for the insulation, but space must be allowed to install the insulation; for example, if a foam plastic insulation 20 centimeters in thickness is being installed, the total clearance required for such installation often is in the order of 75 centimeters. Plastic foam or similar insulating material installed in such a manner provides highly desirable insulation but oftentimes even greater insulating value is required or alternately in order to conserve on raw materials it is sometimes desirable to substitute, at least in part, a lower cost insulating material. Particulate flowable insulating materials are highly desirable from both the cost and labor standpoint but require, in general, restraining walls and careful installation.

It would be desirable if there were available an improved method for the insulation of containers.

It would also be desirable if there were available an improved method for the thermal insulation of containers employing at least two varieties of thermal insulating material.

It would also be desirable if there were available a method for improved insulation of vessels having curved surfaces.

These benefits and other advantages in accordance with the present invention are achieved in a method for the insulation of a container, the method comprising providing a container having at least a generally rigid containment wall, disposing over at least one face of the containment wall a body of thermally insulating material of substantially lesser rigidity than the container wall to provide thermal insulation for the container, the improvement which comprises displacing the thermally insulating layer away from the container wall by means of fluid pressure applied between the container wall and the insulating layer and providing a solid thermal insulating material to a space formed between the container wall and the insulating layer.

Also contemplated within the scope of the present invention is an improved method of thermally insulating a container, the container having a wall, a coherent layer of thermal insulation disposed over the wall to provide thermal insulation therefore, a fluid pressure separating means disposed between the insulating layer and the vessel wall whereby on the application of fluid pressure to the fluid pressure separating means the insulating layer and container wall are disposed in generally spaced-apart relationship.

Further features and advantages will become more apparent from the following specification taken in connection with the Drawing wherein:

FIG. 1 schematically represents a vessel in accordance with the present invention;

Figure 7:
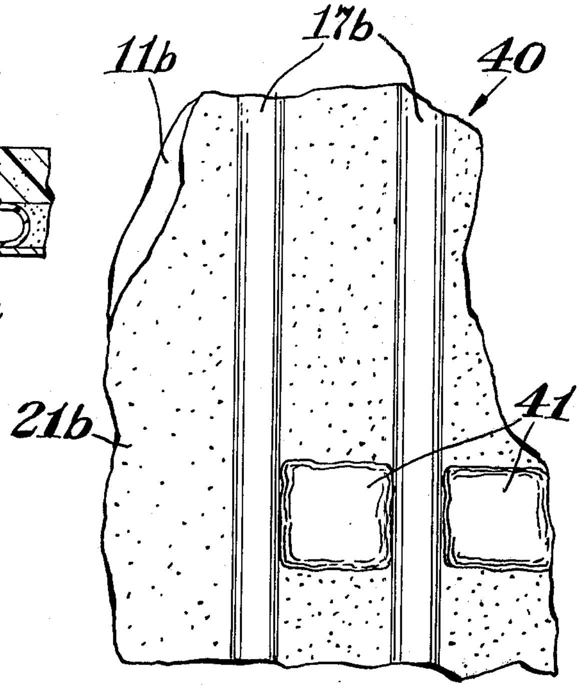
Figure 6:
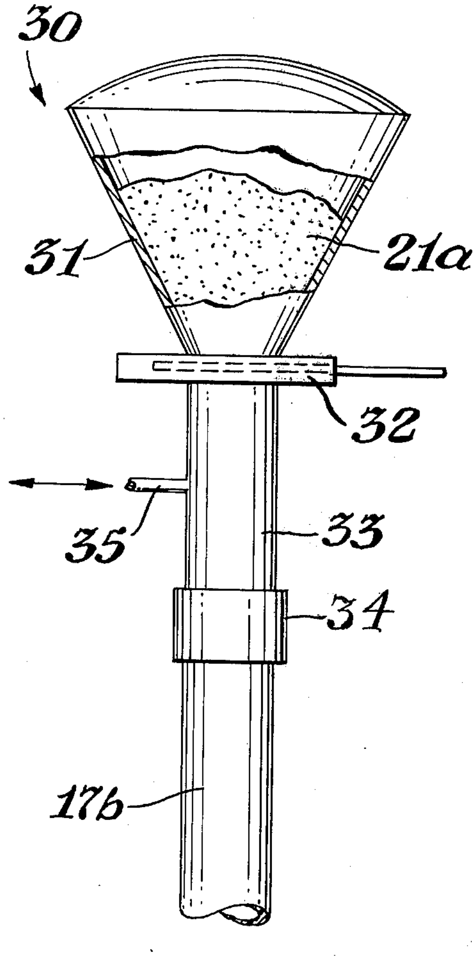
Figure 8:
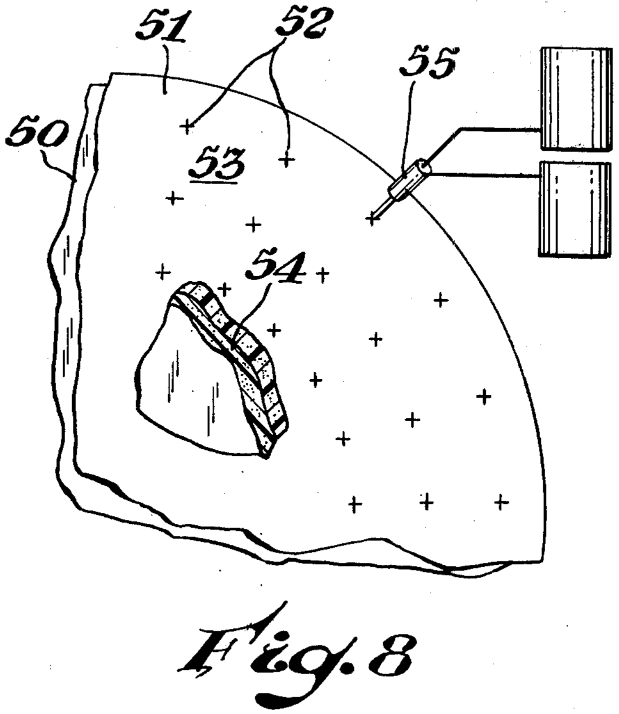
Figure 9:
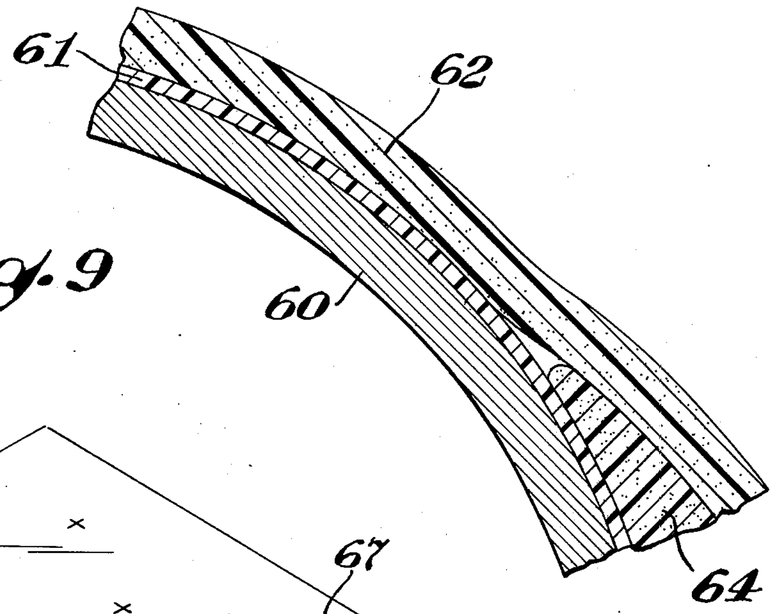
Figure 10:
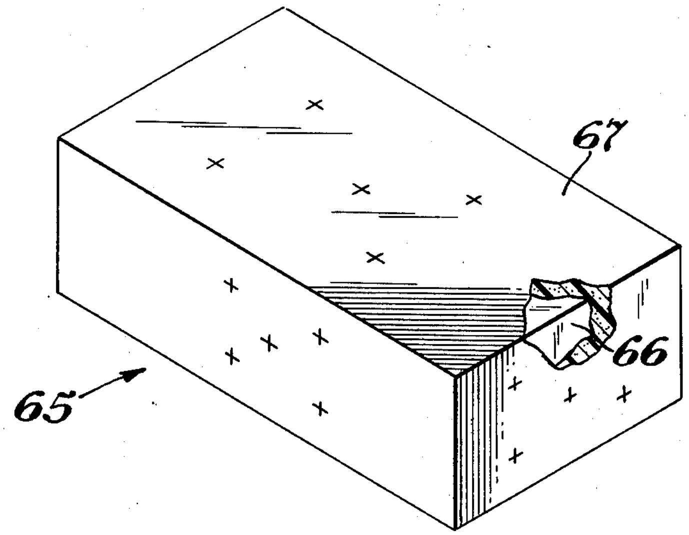
Figure 11:
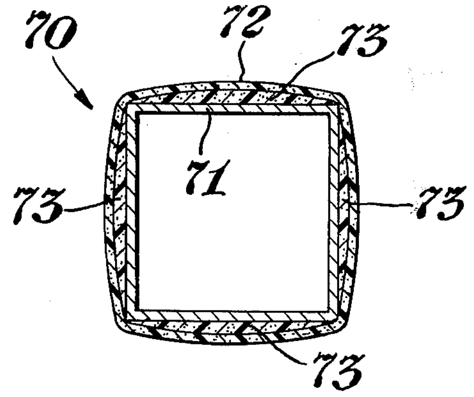
Figure 12:
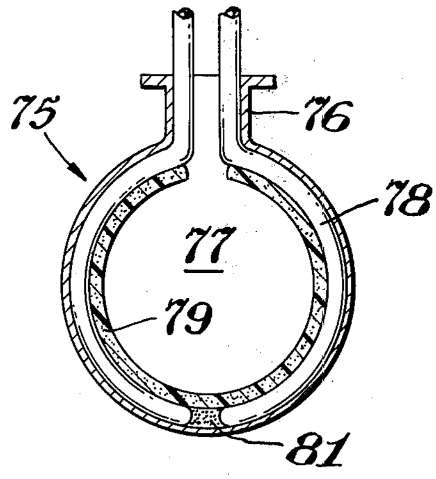

FIG. 6 schematically depicts an apparatus for the addition of particulate insulating material for structures in accordance with the present invention;

FIG. 7 is a schematic fractional cut-away representation of a portion of insulation of a vessel in accordance with the invention;

FIG. 8 schematically represents a portion of a vessel being insulated in accordance with the present invention;

FIG. 9 is a fractional schematic cross-sectional representation of a wall of a vessel such as the vessel of FIG. 8;

FIG. 10 is a schematic representation of a vessel to be insulated in accordance with the invention;

FIG. 11 is a schematic sectional view of a vessel such as the vessel of FIG. 10 insulated in accordance with the invention;

FIG. 12 is a schematic sectional representation of a vessel being insulated in accordance with the present invention wherein the thermal insulation is internally disposed.

Figure 1:
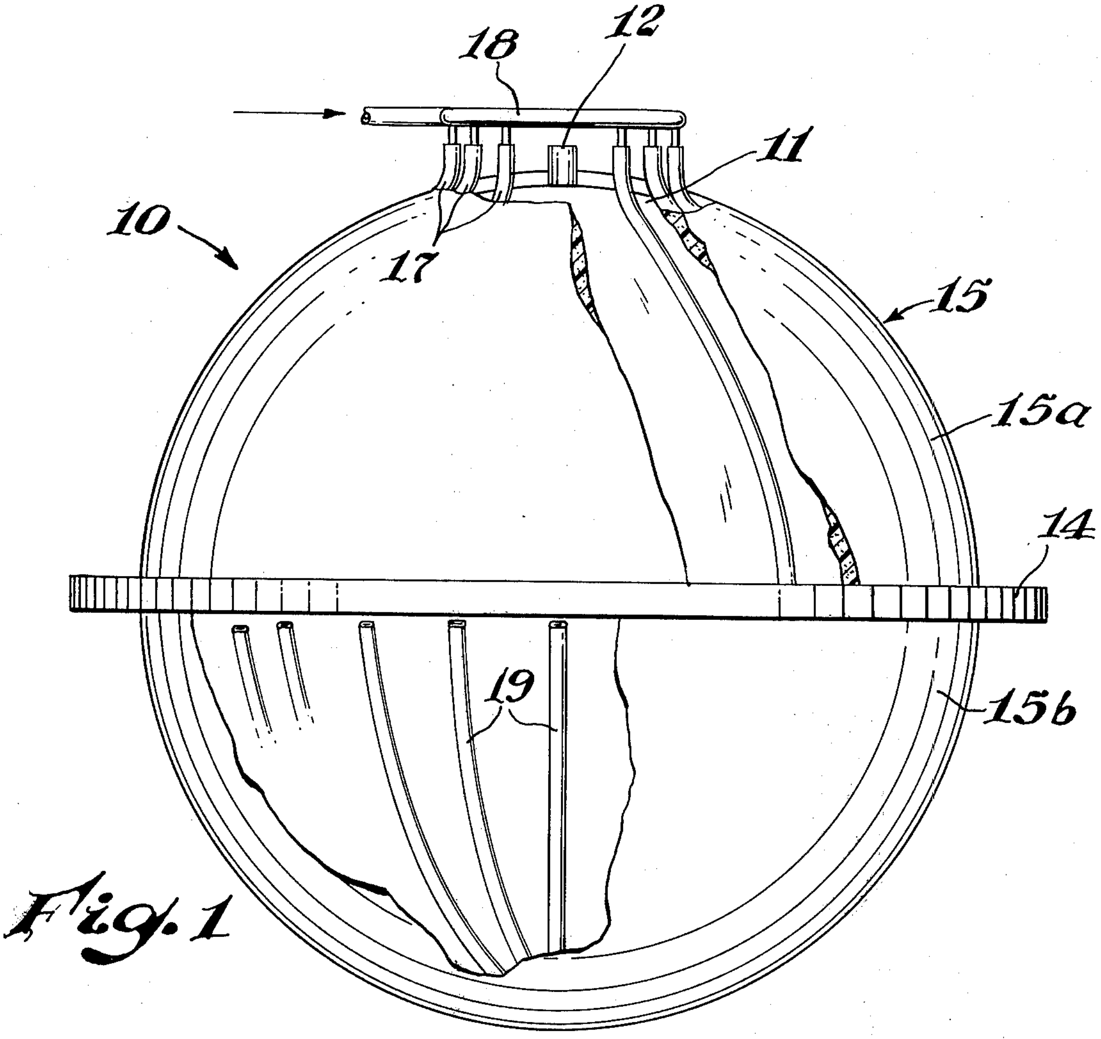

In FIG. 1 there is schematically depicted a partially cut-away view of a vessel in accordance with the present invention generally designated by the reference numeral 10. The vessel 10 comprises in cooperative combination an inner or containment vessel 11. The containment vessel 11 has a generally spherical configuration and encloses a space within, not shown. The vessel 11 has an access port or manhole 12 generally upwardly disposed. The vessel 10 has a support flange 14 generally equatorially disposed thereon. The flange 14 provides a means of support for the vessel 11. Thermal insulation 15 is disposed about the exterior of the containment vessel 11. The insulation 15 comprises a first or upper portion **15*a* having a generally hemispherical configuration and a second or lower portion 15*b* also of generally hemispherical configuration. The portions 15*a* and 15*b* are each generally monolithic insulating bodies affixed to the flange 14. A plurality of flexible inflatable tubes 17 extend between the vessel 11 and the adjacent insulating portions 15***a* from a location adjacent the access port 12 to a location generally adjacent the flange 14. The tubes 14 are generally meridionally disposed and terminate at a closed end generally adjacent the flange 14. Each of the tubes 17 are generally symmetrically disposed about the axis of generation of the flange 14. An annular header 18 is disposed adjacent the access port 12 and is in operative communication with the tubes 17. Fluid pressure enters the header in the direction of the double headed arrow and causes the tubes 17 to expand or deflate, depending upon whether the pressure applied to the header is greater or lesser than atmospheric pressure. A plurality of tubes 19 are generally similarly disposed between the insulation portion 15*b* and the vessel wall 11 in the hemisphere remote from the access port 12. Thus, pressure greater than atmospheric will cause the tubes 19 to expand and exert pressure on the insulation portion 15*b*.

Figure 2:
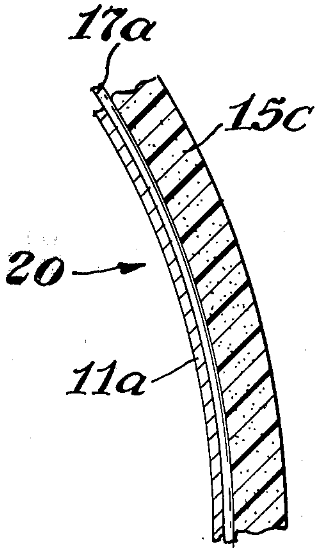
FIG. 2 is a fractional sectional view of a container wall in accordance with the present invention.

In FIG. 2 there is depicted a fractional sectional view of a wall portion 20 of a container such as the container 10 of FIG. 1 wherein an innermost container wall 11*a* has disposed external thereto a flattened flexible fluid containment tube 17*a*, a layer of thermal insulation 15*c* is disposed adjacent the flattened tube 17*a* and remote from the vessel wall 11*a*.

Figure 3:
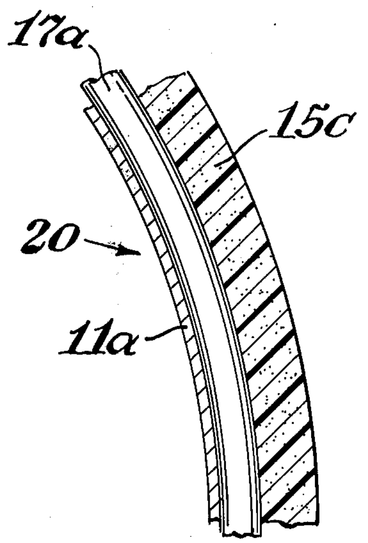
FIG. 3 is a fractional sectional view of an insulated container wall in accordance with the present invention wherein the insulating layer has been spaced from the container by fluid pressure.

FIG. 3 is a representation of the wall portion 20 when fluid pressure has been applied to the tube 17*a* inflating the tube and moving the insulation layer 15*c* away from the wall 11*a*.

Figure 4:
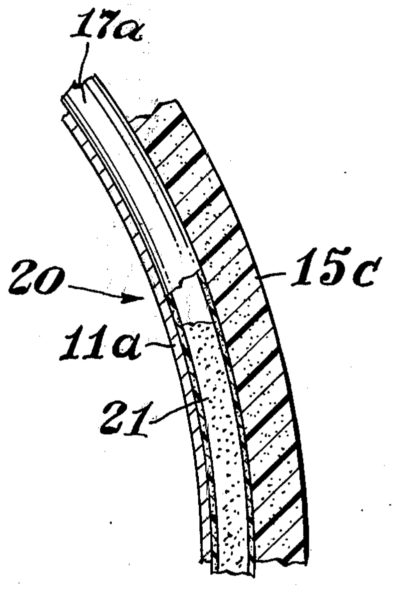
FIG. 4 is a schematic fractional sectional view of a wall such as shown in FIG. 3 wherein particulate insulating material has been added thereto.

FIG. 4 is a representation of the wall of the wall portion 20 and the tube 17*a* wherein the tube 17*a* has been partially filled with a particulate flowable thermal insulating material 21 such as perlite, vermiculite, foamed plastic particles, and the like.

Figure 5:
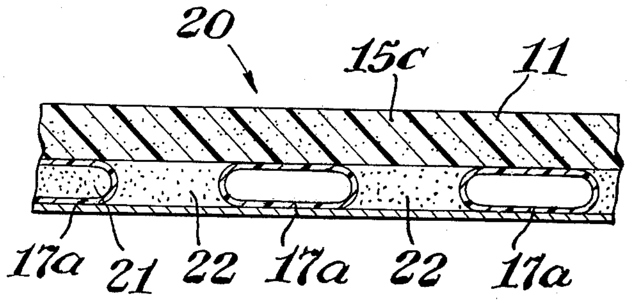
FIG. 5 is a vertical sectional view of a wall such as the wall of FIG. 4.

FIG. 5 is a fractional sectional view of the wall portion 20 taken in a direction normal to the direction of the sections of FIGS. 2, 3 and 4 showing a plurality of inflated tubes 17*a* which define spaces 22 therebetween. The spaces 22 contain a particulate thermal insulating material 21. One of the tubes 17*a* is shown containing the particulate insulating material 21.

In preparing vessels in accordance with the present invention and in the practice of the present invention, a vessel such as the vessel 11 is prepared for insulating by disposing a plurality of tubes such as the tubes 17 in a generally meridional manner, conveniently equally spaced about the vessel. The insulating layer 15*a* is then formed over the tubes 17 when the tubes 17 are in a flattened configuration. Beneficially, such an insulating layer is particularly conveniently prepared using a spiral generating technique as set forth in the hereinbefore cited patents. The lower hemisphere of the container may be prepared in a generally similar manner. For convenience, the open end of the tubes 19 are disposed adjacent the flange 14 and the closed ends at a location generally diametrically disposed from the access port 12. The thermally insulating layer 15*b* is then formed over the tubes 19. Air or other fluid pressure is then applied to the header 18 causing the tubes 17 to expand and stretch the insulation 15*a* generally in the manner as indicated in FIG. 3. Particulate insulation such as the insulation 21 of FIGS. 4 and 5 can readily be applied in the spaces created between the insulating layer 15*a* and the adjacent surface of the container 11 by the simple expedient of pouring the particulate insulation, insulating material such as the insulating material 21 of FIGS. 4 and 5. With the particulate insulating material 21 in place, the insulating layer 15*c* is supported against collapse and the tubes 17 may be filled with an additional quantity of the particulate insulating material 21. Alternately, if desired the tubes such as the tubes 17*a* may be filled with the particulate insulating material and the spaces 22 therebetween filled at a later time or not at all depending upon the insulation requirements of the particular vessel. If it is desired to maximize the insulating value of the tank insulation the tubes, after filling, may be evacuated to subatmospheric pressure or air displaced therefrom with a gas which condenses at service temperature. In the event a vessel such as the vessel 11 is insulated by means other than spiral generation it is usually desirable to provide for the individual inflation of the tubes.

In FIG. 6, there is schematically depicted an apparatus 30 for the filling of tubes such as the tube 17*b* of FIG. 7 while the tube is under fluid pressure. The apparatus 30 comprises a generally gas-tight hopper 31 containing a particulate insulating material 31*a*. The hopper 31*a* has a bottom or discharge valve 32 which communicates with a conduit 33. Conduit 33 in turn communicates with the tube 17*b* and is sealed by a resilient sealing collar 34, and conduit 33 is in operative communication with a fluid supply means 35. In operation of the apparatus as depicted in FIG. 6, the fluid under pressure such as air flows through the conduit 33 from the fluid supply means 35 inflating the tube 17*b* to a desired degree and moving the insulation such as the insulation 15*c* a desired distance from the vessel wall. The valve 32 is then opened and particulate insulating material 21*a* falls into the tube 17*b*. The fluid supply means 35 can supply gas at alternating super and subatmospheric pressure or pulsed superatmospheric pressure to promote settling and compaction of the particulate insulating material within the tube 17*b*.

In FIG. 7 there is schematically depicted a fractional cut-away view of a container insulated in accordance with the present invention generally designated by the reference numeral 40. The container 40 has a primary container 11*b* having particulate insulating material 21*b* disposed on the surface thereof between two fluid-expanded tubes 17*b*. Disposed between tubes 17*b* are short bridges or rigid insulation stops 41 of a synthetic resinous composition formed by injecting a foam forming composition through an insulating layer such as the insulating layer 15*c* at a location above particulate insulation such as the insulation 21*b*, thereby providing a plurality of generally vertically spaced supports for the particulate insulation and minimizing compaction thereof due to the effect of gravity.

In FIG. 8 there is schematically depicted a fractional view of a vessel 50 being insulated in accordance with the present invention. The vessel 50 has an external, generally monolithic shell 51 of thermally insulating material such as, for example, polystyrene foam, polyurethane foam, and the like. A plurality of crosses 52 are shown on an external surface 53 of the insulating layer 51. A second plastic foam insulating layer 54 is disposed between the vessel 50 and the insulating layer 51. A foamable hardenable liquid dispensing apparatus 55 is depicted in engagement with the layer 51 and is injecting foamable hardenable material between the layer 51 and the vessel 50. The foaming pressure of the hardenable foamable liquid such as, for example, a polyurethane foam composition, inflates the layer 51 and displaces it from the adjacent surfaces of the vessel 50 to form the layer 54. The crosses 52 represent points of injection of the foamable hardenable material for the formation of the layer 54.

In FIG. 9 there is a schematic sectional view of a portion of a vessel 60 having disposed on its outer surface a synthetic resinous thermoplastic slip sheet 61 such as polyethylene film. Adjacent the face 61 and remote from the wall 60 is a monolithic layer of synthetic resinous foam insulation 62. A portion 64 of a foamable layer such as the foam layer 54 is shown disposed between the layer 62 and the film 61. The portion 64 has intruded between the layer 62 and the film 61 due to the foaming pressure of a liquid foamable hardenable composition such as is supplied by the apparatus 55 of FIG. 8. Sequential injections of foamable hardenable material form a continuous layer such as the layer 54 of FIG. 8. Beneficially, if desired a plastic film such as the film 61 of polyethylene is employed to reduce or eliminate adhesion of the layers 62 and 64 to the surface of the container.

In FIG. 10 there is schematically represented a partly-in-section view of an insulated rectangular container 65. The container 65 comprises an inner rectangular container 66 and an exterior monolithic rectangular insulating layer 67. Crosses on the faces of the container indicate points of injection of foamable hardenable material such as is supplied by the apparatus 55 of FIG. 8.

FIG. 11 is a sectional view of a rectangular container 70 insulated in accordance with the present invention. The container 70 comprises an inner container 71 having a generally rectangular monolithic insulating layer 72 disposed thereabout. On each face of the container 71 is disposed a generally lens-like layer 73 of foamed insulating material formed by the injection of hardenable, foamable material such as by the apparatus 55 of FIG. 8. Insulation of rectangular vessels in accordance with the present invention does not provide the uniformity which can be obtained with spherical vessels, however, a substantial improvement or reduction of heat transfer from the interior to the exterior of the vessel is achieved.

In FIG. 12 there is schematically depicted a sectional view of a vessel 75 being insulated in accordance with the invention. The vessel 75 is a generally spherical configuration and defines an access port 76. The vessel 76 defines therein a generally spherical cavity 77. Within the cavity 77 are disposed a plurality of tubes 78 generally meridionally disposed. The tubes 78 are flexible inflatable tubes and are depicted in an inflated condition. A generally spherical thermally insulating layer 79 is disposed within the tubes 78. The spherical insulation 79 has been generally radially compressed by inflation of the tubes 78 and moved away from the adjacent inner walls of the vessel. Particulate insulation material 81 is depicted between the portions of the tube 78 remote from the access port 76.

The present invention is used with particular benefit on larger vessels. Oftentimes the thermal insulation applied to a vessel is of a relatively brittle material capable of only minor elongation, for example, 1 to 2 percent. Some desirable plastic foams such as polystyrene foam in unflexibilized form have a very small elongation prior to rupture; thus, the inflation of insulation about a vessel 20 centimeters in diameter will give much less than the space obtainable by inflating the insulation about a vessel 30 meters in diameter. Depending on the nature of the insulation, inflation can be accomplished in one or more steps or stages. When using synthetic resinous thermoplastic foams, oftentimes it is desirable to inflate in two or more stages depending upon the precise nature of the material. Generally most thermoplastics when placed under stress relax after a period of hours or days depending on the specific material. Thus, a plastic insulation can be inflated until it approaches its breaking point, permitted to relax, and again inflated. Alternately, if desired, inflation pressure can be applied and maintained over a period of several days and the creep characteristic of the plastic employed to obtain maximum inflation.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A method for the insulating of a container, the method comprising providing a container having at least a generally rigid containment wall, disposing over at least one face of the containment wall a layer of solid thermally insulating material of substantially lesser rigidity than the container wall to provide thermal insulation for the container, the improvement which comprises displacing the thermally insulating layer away from the container wall by means of fluid pressure applied between the container wall and the insulating layer and providing a solid thermal insulating material to a space formed between the container wall and the insulating layer.

2. The method of claim 1 wherein the thermal insulating layer is displaced away from the container by means of gas pressure.

3. The method of claim 2 wherein the gas is contained within a flexible tube.

4. The method of claim 1 wherein said fluid pressure is applied by a foamable, hardenable resinous composition.

5. The method of claim 1 wherein the solid thermal insulating material comprises a particulate insulation material.

6. The method of claim 1 wherein the solid thermal insulating material is a plastic foam.

* * * * *